United States Patent [19]

Fuchs

[11] 4,430,224

[45] Feb. 7, 1984

[54] PROCESS AND APPARATUS FOR BIOLOGICALLY TREATING WASTE WATERS

[75] Inventor: Uwe Fuchs, Munich, Fed. Rep. of Germany

[73] Assignee: Linde Aktiengesellschaft, Wiesbaden, Fed. Rep. of Germany

[21] Appl. No.: 326,308

[22] Filed: Dec. 1, 1981

[30] Foreign Application Priority Data

Dec. 1, 1980 [DE] Fed. Rep. of Germany ....... 3045158

[51] Int. Cl.$^3$ ............................................... C02F 3/26
[52] U.S. Cl. .................................. 210/604; 210/627; 210/195.3; 210/218
[58] Field of Search ........................ 210/604, 623–629, 210/195.3, 199, 202, 197, 220, 201, 195.1, 218

[56] References Cited

U.S. PATENT DOCUMENTS

| | | | |
|---|---|---|---|
| 3,436,341 | 4/1969 | Beuthe | 210/627 |
| 3,725,258 | 4/1973 | Spector et al. | 210/604 |
| 3,733,264 | 5/1973 | Spector et al. | 210/604 |
| 3,960,717 | 6/1976 | Wyatt | 210/625 |
| 4,087,361 | 5/1978 | Block et al. | 210/199 |

*Primary Examiner*—Benoit Castel
*Attorney, Agent, or Firm*—Millen & White

[57] ABSTRACT

In a process and apparatus for conducting an activated sludge process in an activation basin having multiple sections, preferably at least three sections are provided for conducting the process with each succeeding section being larger in volume than the previous section by an amount about equal to the volume of the first section. It is preferred that the process be conducted in the first section by feeding the first section with an oxygen enriched gas, and with the next section in line fed with the exhaust from the first section, and the third section being aerated with air. In a specific refinement, there are provided four sections with the first two sections sealed with respect to the atmosphere.

9 Claims, 2 Drawing Figures

PROCESS AND APPARATUS FOR BIOLOGICALLY TREATING WASTE WATERS

BACKGROUND OF THE INVENTION

The invention relates to a process for biologically treating waste-waters, wherein the waste-water is aerated with pure oxygen and/or air, and in the presence of activated sludge in an activation basin having plural basin sections. The mixture of waste-water and activated-sludge is then removed from the activation basin and is separated, in a finel settling stage, into purified water and sludge. From the final settling stage the sludge is recycled, at least in part, to the activation basin. The invention also relates to an apparatus for implementing the process.

Such a process is disclosed for instance, in German Pat. No. 20 32 480. In this process for treating waste-waters containing biochemically oxidizable ingredients, a gas containing more than 50% by volume of oxygen is passed sequentially through at least two basin sections. Each of the basin sections is sealed in a gas-tight manner with respect to the atmosphere. In order to efficiently utilize the oxygen contained in the gas fed into the basin sections at an economical rate with respect to energy consumption, precautions are taken so that the contents of solids suspended in the liquid in the first basin section will be as high as possible. Furthermore, other precautions are taken to control the liquid supply and the amount of gas fed to the first basin section. Concomitantly, the energy consumption required for the circulation and the mixing in the basin sections is determined as a function of the amount of oxygen contained in the exhaust gas from the last basin section. As a result of the volumes of the individual basin sections being equal, the substrate concentration in the first basin section is often too low for achieving maximum possible consumption of organic materials. Moreover, this occurs even with a high content of suspended solid particles obtained by recycling a corresponding amount of activated sludge. As a result, the most efficient biological performance of the activated sludge is not realized in this type of process.

It is therefore an object of the invention to modify such a process of the initially described type, and to provide equipment for carrying out such a modified process wherein highly efficient biological performance of the activated sludge is achieved in a simple and economical manner.

Upon further study of the specification and appended claims, other objects and advantages of the invention will become apparent.

SUMMARY OF THE INVENTION

The objects are attained by feeding incoming waste-waters into an activation basin having at least two, especially at least three separate interconnected basin sections or zones wherein the volumes of the individual basin sections are selected so that, in a downstream direction, the basin sections each have an increased volume relative to the volume of the preceding basic section.

In one embodiment, the wastewater, after passing into a first section, is passed into at least a second section having a volume exceeding that of the first section by a multiple thereof. The wastewater can also be passed into a third section exceeding the volume of the second section by a multiple of the volume of the first section.

Whereas, it is preferable that the volume of each section be increased by an amount about equal to the volume of the first section, some advantage is obtained when the increase in size of each section is about 50 to 150 especially 80 to 100% of the first section.

The described division into sections ensures that the substrate concentration always remains very high in the beginning sections of the activation basin, i.e., in the first section, thereby allowing the bacteria to have the maximum respiration and the highest growth rate under any load condition. In the subsequent sections the bacteria will progressively reduce their activity due to the lower concentration of substrate, i.e., lower consumption thereof by the bacteria, and the increasingly larger basin section volumes.

The amount of the described increase in size of each section is dependent on the amount of decomposition of the waste water impurities to be achieved and on the load of the waste water. The higher the load of the water water, the higher the amount of the described increase in size of each section must be. As a result of the higher level of performance in the first basin section, such a system, especially in the case of waste-water highly loaded with biologically oxidizable impurities, allows the use of a system having relatively smaller total volume than is used in conventional activation basins of the type in which the waste-waters are thoroughly mixed, or in the type which is divided into equal size cascaded chambers. Moreover, some of the waste-water ingredients which present problems because they are difficult to decompose can be better eliminated in the system of the invention. Therefore, as compared to prior art systems on the whole, the invention provides a greater process stability with respect to the Chemical Oxygen Demand (COD) reduction and the Biological Oxygen Demand $(BOD)_5$ reduction, in particular for surge loads. (By a waste-water highly loaded with biologically oxidizable impurities, is meant a waste-water having a BOD in the influent of at least 750, especially at least 2000 mg/l.)

On account of the high growth rates which take place in the first basin section, in addition to the maximum respiration which is obtained therein, if there is provided a sufficient supply of $O_2$, an additional amount of the biologically oxidizable contents of the waste-water are converted into bacterial mass. Although $O_2$ consumption is initially increased, when the overall system is considered as a whole, oxygen is saved because of reduced consumption in the last section.

As a result of the downstream basin sections being less loaded than the first basin section; e.g., the waste water into the first section has a BOD in the influent of 2000 mg/l and the BOD in the effluent from the first section feeding into the second section is not more than a average of 850, especially not more than 600 mg/l, and the BOD in the effluent from the second section, being not more than an average of 450, especially not more than 200 mg/l, and the BOD in the effluent from the third section being not more than an average of 60 especially not more than 40 mg/l; the settling properties of the sludge achieved in these sections are so good that the final settling operation in the settling or clarifying tank can be carried out on a small scale. Moreover, because maximum respiration by the organisms occurs in the first basin section when an adequate oxygen supply is provided, and because of the low loads present in the ensuing basin sections, it is ensured that sludge degeneration, such as bulking sludge, is substantially prevented.

The process of the invention is advantageously carried out so that if there is provided a total of three basin sections, the first one is fed with pure oxygen or at least with a gas richer in oxygen than air, and the basin sections following are supplied selectively with a relatively lower oxygen content gas or air. More specifically, it is preferred that the first basin section be fed with a gas containing 60 to 99 percent oxygen. The second section should be fed with a gas containing 21 to 99 percent oxygen, and more preferably 30 to 50 percent, and the third section is fed with a gas having a composition about the same as the composition of air. In this regard, although most of the substrate decay occurs in the first section, the provision of the specific gas composition to the second section enhances the efficiency of the process, in so far as it becomes possible to feed the exhaust gas of the first section to the second section and to fully utilize the oxygen content in the exhaust gas so that on the one hand, a saving in oxygen is reached, and on the other hand, no need for a specially produced gas with a higher concentration than air is necessary. Thus, there is ensured in a simple way that there will be an ample oxygen supply in the first basin section, or in the first two basin sections in order to meet the demands of the enormously high oxygen consumption created by the maximum respiration by the organisms. As the load sequentially decreases in the following basin sections, it is sufficient in most cases to feed said sections with air by means of surface aerators.

More advantageously, when feeding pure oxygen or a gas richer in oxygen than air into the individual basin sections, the exhaust gas from each preceeding section can be supplied to the next in line. Thus, it becomes possible to fully utilize the residual oxygen content in the exhaust gas. In addition, in the event that the load continues at a high level in the next section, there will be little or no need for a specially produced gas containing a higher concentration of oxygen than air.

The apparatus for carrying out the process of the invention comprises an activation basin having several basin sections and a final settling or clarifying tank following the multiple section activation basin. In the invention, the apparatus comprises an activation basin having preferably at least three basin sections sequentially arranged in the direction of the waste-water flow. Each basin section after the first exceeds the volume of the preceding one by preferably about the volume of the first.

If a total of three basin sections are provided, the first section is appropriately sealed with respect to the atmosphere, and comprises feed means for feeding pure oxygen, or for feeding a gas richer in oxygen than air, and the two following basin sections are each selectively provided with feed means for a relatively lower oxygen content gas or air.

If at least four basin sections are provided, the first two sections should be sealed against the atmosphere, and should include feed means for feeding pure oxygen, or a gas richer in oxygen than air, and only the following sections should selectively include feed means for a relatively lower oxygen content gas or air.

If a basin section is provided with feed means for pure oxygen, or a gas richer in oxygen than air, it will also be advantageous to provide this section with an exhaust gas conduit connected to the intake means of the next basin section thereby flowing the exhaust from the section fed with pure oxygen to the next section for a more efficient utilization of the oxygen supply.

BRIEF DESCRIPTION OF THE DRAWING

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION OF THE INVENTION

Figure 1:
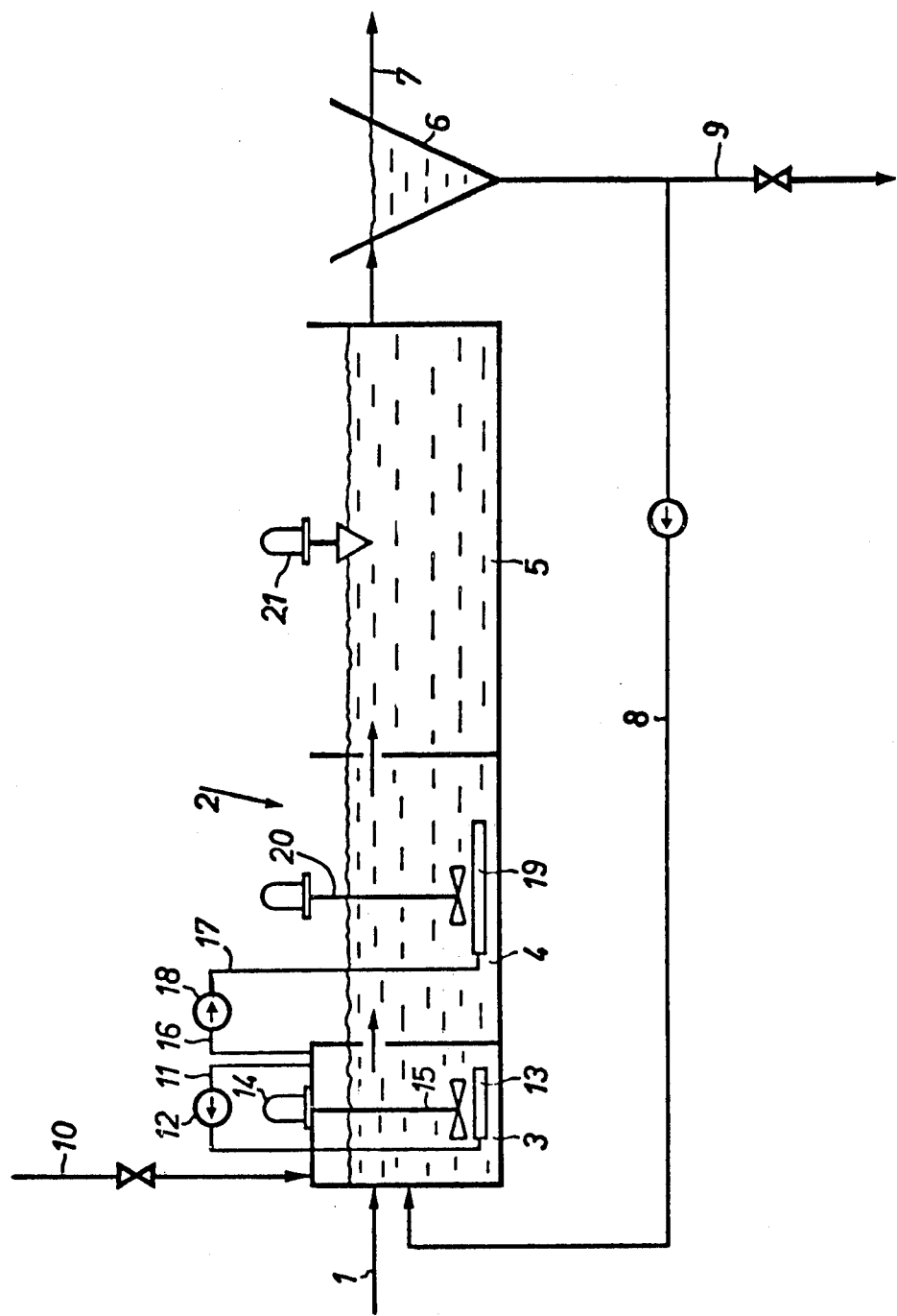
FIG. 1 schematically illustrates a preferred embodiment of the apparatus for implementing the process of the invention, and which will be explained in further detail below.

FIG. 1 shows a biological waste-water treatment plant having an intake 1 for receiving waste-water therethrough. The treatment plant has an activation basin 2 comprising in a preferred embodiment three basin sections 3, 4 and 5. A final settling tank 6 designed as a simple settling tank or clarifying tank is provided in line after the activation basin with an exhaust line 7 for evacuating the purified waste-water therefrom. More specifically, treated waste-water from the activation basin 2 is fed into the after-settling tank 6 wherein settling occurs with the purified effluent water removed via conduit 7. The after-settling tank 6 is also connected by a feedback conduit 8 to the activation basin 2 for the purpose of feeding back activated sludge, and a tap line 9 is provided in the feedback conduit 8 for removing excess sludge if desired from the plant. More specifically, by recycling sludge, the level of organisms necessary for conducting the activated sludge process in the basin 2 can be maintained.

Figure 2:
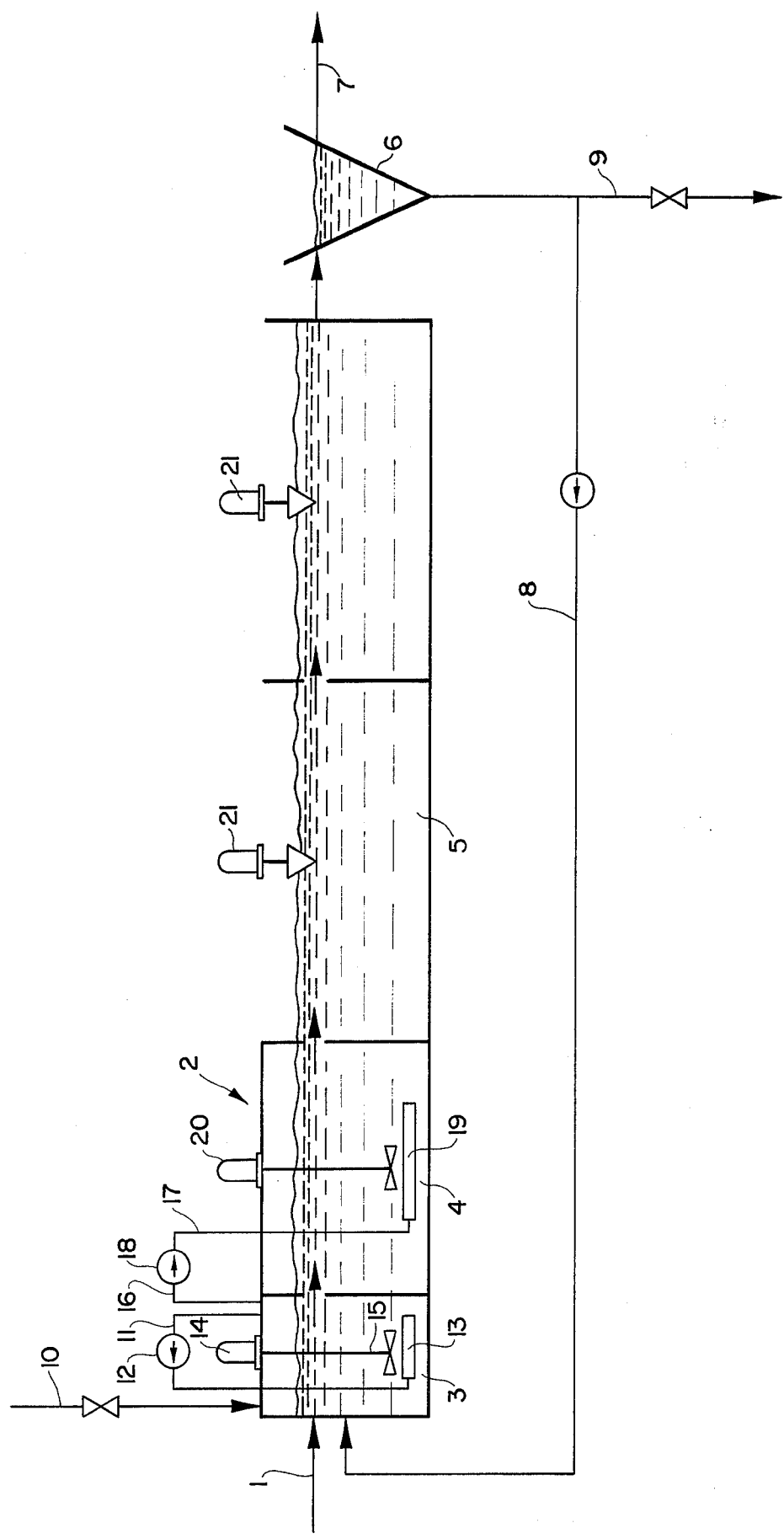
FIG. 2 schematically illustrates a second embodiment of the invention wherein four basin sections are employed.

In the apparatus of the invention, the basin sections 3, 4 and 5 of the activation basin 2, as shown in FIGS. 1 and 2, are designed so that beyond the first section 3, each additional section 4 and 5 is larger in the volume than the previous basin section preferably by an amount equal to the volume of the first section 3. However, the basin sections can also merely increase in size by a substantial percentage of the volume of first section as discussed previously. As a result of this type of division, the substrate concentration in the first section 3 is substantially higher than in the following two sections 4 and 5. Thus, the activated sludge bacteria fed back through the feedback conduit 8 into the first section 3 are forced to breathe maximally at any load condition, whereby a high oxygen consumption is ensured. It is for this reason that the first basin section 3 is sealed with respect to the atmosphere, and is supplied by means of a gas feed line 10 with pure oxygen, or at least with a gas richer in oxygen than air. As previously discussed, it is preferred that the $O_2$ concentration of the gas fed to the first section be 60 to 99 percent, more preferably 80 to 90 percent of the gas. The gas feed device is designed so that the enriched oxygen atmosphere in the enclosure of the first basin section 2, the oxygen enriched gas introduced through the gas feed line 10, and the gas rising out of the liquid are evacuated through a line 11 having a controlled blower 12 of conventional construction, which serves to control and maintain the volume flow of gas within a predetermined range in accordance with the actual size of the first basin section and the load thereon. In this regard, conventional monitoring means can be provided for monitoring the load so that the blower can be adjusted accordingly. More specifically, this gas is fed through the blower 12 into a gas distributor 13 mounted near the bottom of the first section. An adjustable speed motor 14 drives agitating means 15 located above the gas distributor 13 for the purpose of throughly mixing the substances present in the section. The exhaust gas which then has a lower oxygen content than the gas is evacuated through an exhaust gas line 16.

As a result of the respiration of the bacteria in the second and third basin sections 4 and 5 decreasing due to substrate decay, i.e., reduced substrate level, and the sequentially increasing basin volumes, it is sufficient to supply these basin sections with less than pure oxygen. For instance, as previously discussed, the second section 4 can be fed as shown with the oxygen-impoverished waste-gas from the first section 3, and the third section 5 can be fed with air by means of surface aerating means 21 which is conventional in nature, and both sections 4 and 5 if desired can be open to the atmosphere.

It is preferred that the exhaust gas from the first basin section 3 is fed into the second section 4 by means of a gas distributor 19 located near the basin bottom. The gas distributor 19 is connected to a gas supply line 17 which includes a regulated or controlled blower 18, similar to blower 12, for controlling flow therethrough. More specifically, the gas supply line 17 is connected to the exhaust gas line 16 of the first section 3 whereby the oxygen depleted gas therefrom can be efficiently utilized in basin section 4. As in basin section 3, the materials present in this section are mixed by agitating means 20 mounted above the gas distributor 19.

In an alternative embodiment, as shown in FIG. 2, an activation basin can be provided having four basin sections. In this case, the first two sections can be sealed from the atmosphere. The first two sections can both be fed with either pure or an oxygen enriched gas, as discussed previously, with the exhaust from the second section feeding the third section and the fourth section fed by surface aerating means. Alternatively, the exhaust from the first section can be fed to the second sealed section, and the exhaust therfrom fed to the third section, or the third section can also be fed by surface aerating means.

It will become evident to those skilled in the art that other gas feed means can also be used in the individual basin sections. The most important consideration is that the volumes for the individual sections be maintained within the proportions stated, and that at least the first basin section is provided with a gas richer in oxygen than air. As already noted more than 3 basin sections can be sequentially arranged as may be required.

Without further elaboration, it is believed that one skilled in the art can, using the preceding description, utilize the present invention to its fullest extent. The following preferred specific example is, therefore, to be construed as merely illustrative, and not limitative of the disclosure in any way whatsoever. In the following example, all temperatures are set forth uncorrected in degrees Celsius; unless otherwise indicated, all parts and percentages are by weight.

The table below compares the data from a conventional process with the data which is achieved according to the process and apparatus of the invention:

EXAMPLE

| | | conventionally | invention |
|---|---|---|---|
| volume, cascade chamber I | $m^3$ | 1000 | 350 |
| cascade chamber II | | 1000 | 650 |
| cascade chamber III | | 1000 | 1000 |
| total volume, activation basin | $m^3$ | 3000 | 2000 |
| saving in activation basin volume | % | — | about 30% |
| rate of influent waste water, Q | $m^3/h$ | 750 | 750 |
| volume load $B_R$ | $kg/m^3 \cdot day$ | 3 | 4.5 |
| sludge rate load $B_{TS}$ | kg/kg/day | 0.6 | 0.9 |
| aeration time t | h | 4 | 2.7 |
| Specific $O_2$ consumption | kg $O_2$/kg $BOD_5$ -reduced X | 0.65 | 0.5 |
| $O_2$ consumption cascade I $Z_I$ | $g/m^3 \cdot h$ | 115 | 185 |
| $O_2$ consumption cascade II $Z_{II}$ | | 65 | 100 |
| $O_2$ consumption cascade III $Z_{III}$ | | 55 | 50 |
| space load cascade I $B_RI$ | $kg/m^3 \cdot day$ | 9 | 27 |
| cascade II $B_RII$ | | 4 | 7.3 |
| cascade III $B_RIII$ | | 2.1 | 2.0 |
| dry substance in sludge $TS_R$ | $kg/m^3$ | 5 | 5 |
| sludge index Isv | ml/g | 90 | 60 |
| $BOD_5$ in influent | mg/l | 500 | 500 |
| $BOD_5$ in effluent | | $\leq 30$ | $\leq 30$ |
| COD in influent | | 650 | 650 |
| COD in effluent | | $\leq 100$ | $\leq 100$ |

The preceding example can be repeated with similar success by substituting the generically or specifically described reactants and/or operating conditions of this invention for those used in the preceding example. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for biologically treating wastewater by the activated sludge process, wherein the wastewater is aerated in an activation basin comprising a plurality of sections, and wherein the mixture of wastewater and activated sludge is removed from the activation basin, and separated in a settling stage into purified water and sludge with at least a part of the separated sludge being recycled into the activation basin, the improvement comprising:

treating the wastewater in an activation basin having at least four separate sections, comprising the steps of passing the wastewater into a first of said sections and aerating the wastewater in the first section with a gas feed having a higher $O_2$ concentration than air, passing resultant aerated wastewater from the first section into a second section having a volume exceeding the volume of the first section by an amount equal to about the volume of the first section and further aerating the wastewater therin with a gas feed having a higher $O_2$ concentration than air, passing resultant further aerated wastewater from the second section into a third section having a volume exceeding the volume of the second section by an amount equal to about the volume of the first section and also still further aerating the wastewater therein, with the aerating feed being air, and passing resultant still further aerated wastewater from the third section into a fourth section having a volume exceeding the volume of the third section by an amount equal to about the volume of the first section and also still further aerating the wastewater therein, with the aerating feed also being air, before passing the latter to the settling stage.

2. A process as in claim 1, comprising aerating the second section with exhaust gas from the first section.

3. A process as in claim 1 or 2, wherein the first basin section is fed with pure oxygen.

4. A process as in claim 1 or 2, wherein the aeration of the first section is conducted with an oxygen enriched gas having an oxygen proportion of 60 to 99 percent, the aeration of the second section is conducted with an oxygen enriched gas having an oxygen proportion of 30 to 50 percent.

5. A process as in claim 1, comprising aearating the first basin section with pure oxygen and aerating the second basin section with exhaust gas from the first basin section.

6. In an apparatus for conducting an activated sludge process on incoming wastewater, said apparatus of the type comprising an activation basin having multiple sections interconnected in a manner for permitting passage of an incoming stream of wastewater sequentially therethrough, with means for aeration in each basin section being provided, and with a settling or clarifying tank connected downstream from the activation basin for receiving treated wastewater therefrom, the improvement comprising an activation basin having at least first, second, third and fourth basin sections with the first basin section means for aeration comprising enriched $O_2$ feed means for feeding a gas having a higher $O_2$ concentration than air, and in the direction of flow of wastewater, the second basin section having a volume exceeding that of the first basin section by an amount equal to about the volume of the first basin section with the second basin section means for aeration comprising enriched $O_2$ feed means for feeding a gas having a higher $O_2$ concentration than air, the third basin section having a volume exceeding that of the second basin section by an amount equal to about the volume of the first basin section with the third basin section means for aeration comprising air feed means for conducting aeration with air, and the fourth basin section having a volume exceeding that of the third basin section by an amount equal to about the volume of the first basin section with the fourth basin section means for aeration comprising air feed means for conducting aeration with air.

7. An apparatus as in claim 6, wherein said first basin section is sealed with respect to atmosphere.

8. An apparatus as in claim 6, wherein the first and second basin sections are sealed with respect to atmosphere.

9. An apparatus as in claim 6, 7 or 8, wherein the oxygen enriched gas feed means of the first section is connected to source of pure oxygen, and the means for aeration of the second section comprises an exhaust conduit from the first section connected for feeding exhaust gas from the first section into the second section.

* * * * *